Aug. 3, 1954   W. A. MUELLER   2,685,224
METHOD AND SYSTEM FOR PRODUCING SOUND MOTION PICTURES
Filed Oct. 25, 1950
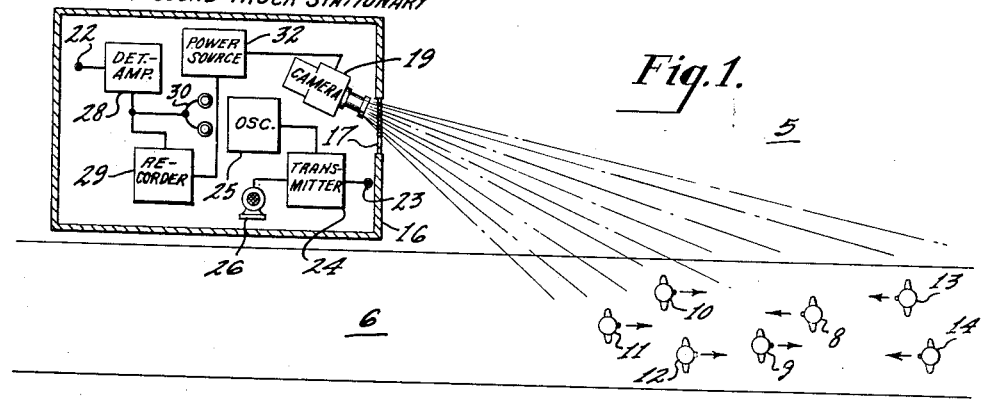
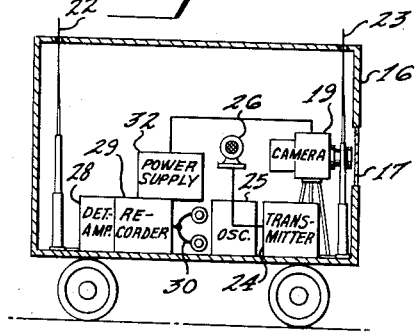
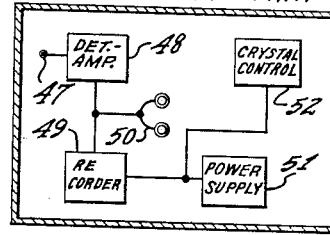
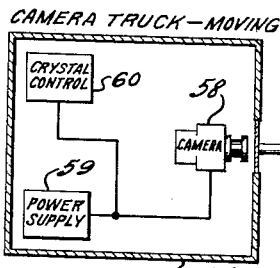
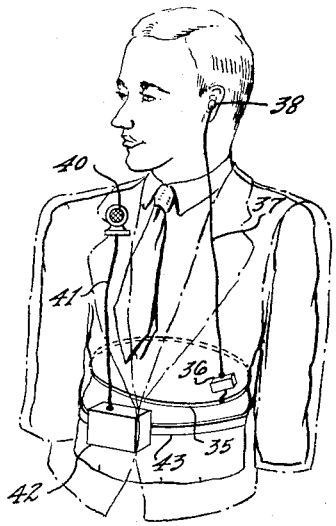
INVENTOR.
William A. Mueller
BY
ATTORNEY Patented Aug. 3, 1954

2,685,224

UNITED STATES PATENT OFFICE 2,685,224

METHOD AND SYSTEM FOR PRODUCING SOUND MOTION PICTURES

William A. Mueller, Los Angeles, Calif., assignor to Warner Bros. Pictures, Inc., Burbank, Calif., a corporation of Delaware Application October 25, 1950, Serial No. 191,965

3 Claims. (Cl. 88—16.2)

This invention relates to the production of motion pictures, and particularly to the recording of a sound track of dialogue and other sounds under natural conditions, such as on location or on a moving vehicle.

Frequently, a picture and sound sequence is desired of a scene such as a crowded city street, village square, residential section of a city, and similar places, where a part of the scene is composed of people who actually are present at the time of photographing. It has been the practice, in shooting such a scene, to conceal the camera and recording equipment in a small pickup truck and to park this truck inconspicuously alongside the curb where the scene is to take place, the picture actors forming the scene being photographed with the concealed equipment. However, when sound is to be recorded comprising the dialogue of the actors and other street noises, it is difficult to conceal the microphone so that it does not attract attention from the passers by and apprise them that a movie scene is being made.

Furthermore, if it is required that the director or his assistant approach the actors to instruct them in the scene, it attracts attention to the shooting, with the result that the passers by act unnaturally or self-consciously, which generally ruins the scene. Also, extraneous pieces of equipment, such as microphone cables and booms, attract attention and create confusion. One aspect of the invention is a method of and means for preventing these distractions, and which permits the scene to be photographed without the knowledge of persons within the photographing angle of the camera.

Another problem is the photographing of actors in a moving automobile, in a boat, on a horse, or in any other type of moving vehicle. At present, such scenes are photographed by having the sound trucks pull a camera insert car on which the camera is located. The camera insert car, in turn, is connected to and pulls the vehicle on which the actors are seated. The camera motor and other cables run from the sound truck to the insert car to synchronize the camera and sound recorders, and, in addition, the microphone cable runs from the sound truck through the camera car to the microphone. These cables require men to extend and contract them during the photographing operation. Sometimes the microphone boom is mounted on the insert car with the microphone dangling over the heads of the actors. Sometimes the microphone bounces into the scene while the sound quality form such a pickup is not good. The manner of photographing is very complicated and cumbersome, but these running shots are very authentic and realistic in motion pictures, and are much less expensive to make than by process photography.

The present invention is directed to a method of and means for photographing and recording both such stationary and moving scenes accurately and efficiently. Each system utilizes a miniature radio transmitter and receiver for transmitting the sound from the actors to the sound recorder. The director can broadcast in the opposite direction to instruct the actors before and during a scene. Thus, by broadcasting in both directions for stationary scenes, passersby will not be apprised of the fact that a scene is being made. By broadcasting from a moving vehicle, the sound truck may be stationary, which will improve the sound recording.

The principal object of the invention, therefore, is to facilitate the photographing of motion picture scenes in their actual settings.

Another object of the invention is to provide an improved method of and means for photographing scenes in their actual settings without the knowledge of others than the photographing crew.

A further object of the invention is to provide an improved method of and means for photographing and recording sound from actors on moving vehicles or objects.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a diagrammatic plan view of one embodiment of the invention.

Fig. 2 is an elevational view of the truck shown in Fig. 1.

Fig. 3 is a diagrammatic illustration of the equipment worn by one of the actors, and Fig. 4 is a diagrammatic plan view of the equipment used in photographing a scene, where both the camera and action are in motion.

Referring now to the drawings, and particularly to Fig. 1, 5 represents a street in a city or village, while 6 represents the sidewalk on which the action to be photographed and recorded occurs. The action may consist of two actors 8 and 9 who are to meet each other and carry on a conversation, while 10, 11, and 12 may represent persons going in one direction, and 13 and 14 may represent persons walking in the opposite direction, as indicated by the arrows. A closed sound truck 16, without external markings, may have a window or opening 17 therein, through which the scene may be photographed by a camera 19. The only portion of the equipment extending beyond the boundary of the truck is a pickup radio antenna 22 and a transmitting radio antenna 23. The transmitting antenna is connected to a transmitter 24, which is fed by an oscillator 25, the transmitter being connected to a microphone 26.

The antenna 22 is connected to a detector-amplifier 28 which feeds a sound recorder 29, a pair of monitoring headphones being shown at 30. Since both the camera and sound recorder are in the same truck, they may be both supplied from the same power supply shown at 32, so that they may each advance their respective films in synchronism.

Referring now to Fig. 3, one of the actors is shown with a miniature radio receiver consisting of a loop antenna 35, a germanium crystal detector 36, and a conductor 37 feeding a hard of hearing earphone 38. This equipment may be hidden under the clothes of the actor, the lead 37 being positioned so as not to be conspicuous. With this equipment, the actor may receive instructions from the director, who talks into microphone 26 and broadcasts from antenna 23.

For recording the dialogue of the actor, a miniature microphone 40 is concealed under the actor's lapel or tie, or other suitable place, the microphone being connected by a conductor 41 to a miniature radio transmitter 42 having a transmitting loop antenna in the belt 43. Thus, the dialogue is transmitted to the sound recorder over the antenna 22. In this manner, therefore, the passers by, such as 10 to 14, inclusive, will be entirely unaware that a motion picture scene is being photographed, and the setting will remain natural during the photographing of the scene. This is true even if the script includes a conversation with one or more of the passers by.

Referring now to Fig. 4, a sound truck similar to truck 16 is shown at 46, this truck including an antenna 47, a detector-amplifier 48, a recorder 49, and monitoring earphones 50. The recorder is driven from a power supply 51 under control of a crystal oscillator 52. This truck may be positioned in the neighborhood of the moving scene to be photographed. In this instance, the scene to be photographed is a plurality of actors 54 in an automobile 55, which is pulled by a tow bar 56 attached to a camera truck 57. The camera truck contains the usual photographing camera 58, a power supply 59 therefor, and a crystal oscillator 60. In the automobile 55 is a concealed microphone 62, a miniature transmitter 63, and a transmitting antenna loop 64.

The scene is photographed and recorded by having the camera truck 57 pull the automobile 55 along a street or over a field, according to the script, and photographing the scene during this action. At the same time, the actors are conversing, and their dialogue is picked up by the microphone 62 and transmitted to the antenna 47 where the sound is recorded on recorder 49. This method of recording will provide a higher quality dialogue than that obtainable with a moving sound truck and dangling microphone.

It is realized that, in the moving scene modification of the invention, the recorder and camera cannot be physically connected to obtain synchronism in the advancement of the respective films. To obtain this synchronism, the sound recorder and camera are both speed controlled by a speed control system of the crystal type, such as described in detail on pages 561 to 570, inclusive, in the May 1949, issue of the Journal of the Society of Motion Picture Engineers. This system is capable of maintaining motor speeds within one part in 25,000, which is sufficiently accurate to obtain the necessary synchronism between the speeds of the separated recorder and camera during the shooting of any particular sequence.

Although not illustrated, the camera truck 57 could also include a transmitter for instructing the actors on the moving vehicle in the same manner as is accomplished in Fig. 1, the transmission being made to the moving vehicle without deleterious effects. The instructions will be transmitted with sufficient clarity to fully advise the actors during the shooting of the scene.

Thus, with the above method and means of sound recording and photographing scenes, a sequence may be made at considerably less expense than that necessary to make similar process shots. The scenes are more realistic and the sound record is of a higher quality than heretofore. The system shown in Fig. 4 is particularly suitable where the action takes place on small boats, where there is no room for positioning a sound recorder and its accessory equipment.

I claim:

1. The method of photographing at any location a scene thereat having instructed actors therein mingling with other persons unaware that they are part of the scene and recording the concomitant sound from said actors and said persons, said scene being photographed in the natural location of said persons from a portable sound truck, comprising photographing said scene with a camera, transmitting sound to said actors with a radio transmitter, transmitting sound from said actors and said persons with a radio transmitter hidden from said camera and carried by one of said instructed actors to said portable sound truck, recording said sound from said scene with a sound recorder synchronized with said camera, all of said photographing, transmission to said actors, and sound recording being concealed in said truck from said actors and said persons.

2. A portable system for photographing a scene at any location having instructed actors therein mingling with other persons unaware that they are part of the scene and recording the sound therefrom, comprising a portable picture and sound truck, a camera for photographing said scene from within said truck, a sound recorder for recording sound from said scene, a radio transmitter for transmitting signals to said scene, and a radio receiver connected to said sound recorder for receiving signals from said scene, said camera, recorder, transmitter, and receiver being concealed in said portable sound truck from said actors and said persons, means electrically connected to said camera and recorder for supplying power to said camera and said recorder for maintaining synchronism therebetween, and a radio receiver and radio transmitter on at least one of said actors and concealed from said camera and from said persons in said scene to be photographed, sound in said scene being transmitted directly by said last mentioned radio transmitter to said radio receiver in said truck, and instructions for action in said scene being transmitted directly by said radio transmitter in said truck to said radio receiver on said actor.

3. A portable system in accordance with claim 2, in which is provided a power supply common to said camera and said recorder to make said portable picture and sound truck self sufficient for photographing, radio transmission and reception, and for sound recording.

References Cited in the file of this patent

UNITED STATES PATENTS

| Number | Name | Date |
| --- | --- | --- |
| 1,219,682 | Vansize | Mar. 20, 1917 |
| 1,945,112 | Hogan | Jan. 20, 1934 |
| 2,320,434 | Holcomb | June 1, 1943 |
| 2,475,641 | Rosenberg | July 12, 1949 |